United States Patent
Moriyoshi

(10) Patent No.: US 8,529,074 B2
(45) Date of Patent: Sep. 10, 2013

(54) PROJECTOR HAVING PROJECTION OPTICAL SYSTEM WITH INCLINED LIGHT BLOCKING MEMBER

(75) Inventor: Akino Moriyoshi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 12/244,301

(22) Filed: Oct. 2, 2008

(65) Prior Publication Data

US 2009/0122291 A1    May 14, 2009

(30) Foreign Application Priority Data

Oct. 2, 2007  (JP) ................. 2007-258291

(51) Int. Cl.
*G03B 3/00* (2006.01)
*G03B 21/14* (2006.01)
*G02B 7/02* (2006.01)
*G02B 9/00* (2006.01)
*G02B 9/08* (2006.01)
*G02B 21/00* (2006.01)
*G02B 23/16* (2006.01)

(52) U.S. Cl.
USPC ........... 353/101; 353/100; 359/611; 359/738; 359/811

(58) Field of Classification Search
USPC ......... 353/75, 88, 100–101, 97–98; 359/362, 359/432–433, 642, 649–651, 676, 726–727, 359/733–736, 738–740, 803, 811, 819, 227, 229, 601, 611–614; 355/71
See application file for complete search history.

(56) References Cited

U.S. PATENT DOCUMENTS

| | | | | |
|---|---|---|---|---|
| 5,519,537 A | * | 5/1996 | Shikama | 359/649 |
| 7,182,470 B2 | * | 2/2007 | Hashimoto et al. | 353/97 |
| RE40,685 E | * | 3/2009 | Koiwai et al. | 359/822 |
| 7,652,831 B2 | * | 1/2010 | Watanabe | 359/811 |
| 7,695,145 B2 | * | 4/2010 | Kojima et al. | 353/101 |
| 2003/0202259 A1 | * | 10/2003 | Nishimae et al. | 359/726 |
| 2007/0236810 A1 | * | 10/2007 | Masui et al. | 359/740 |
| 2009/0201469 A1 | * | 8/2009 | Vissenberg et al. | 353/97 |

FOREIGN PATENT DOCUMENTS

JP    2005-128217    5/2005

* cited by examiner

*Primary Examiner* — Tony Ko
*Assistant Examiner* — Jori S Reilly-Diakun
(74) *Attorney, Agent, or Firm* — Fitzpatrick, Cella, Harper & Scinto

(57) ABSTRACT

A projection optical system for projecting an image of an image display element, includes a lens, a stop, and a holder configured to hold the lens and the stop and disposed at an image-display-element side of the stop. In addition, a light blocking member is disposed at the image-display-element side of the stop and fixed within the holder. At least a part of the light blocking member extends to a position nearer to an optical axis of the lens than the holder, and a face of the light-blocking member nearer to the image-display-element side is inclined in a section including an optical axis of the lens so that a point nearer to the optical axis comes closer to the image display element.

16 Claims, 8 Drawing Sheets

PROJECTOR HAVING PROJECTION OPTICAL SYSTEM WITH INCLINED LIGHT BLOCKING MEMBER

FIELD OF THE INVENTION AND RELATED ART

This invention relates to a projection optical system and an optical device which is comprised of an image display device such as a projector having such projection optical system.

Conventionally, in image display devices such as a projector, for example, it is known that, for the picture quality enhancement of an image projected on a screen, the light ray which does not directly contribute to the image formation is removed by providing a stop member in an illumination optical system or a projection optical system. In recent years, through improvements of a light source or improvements of various display devices such as a liquid crystal display or a digital micromirror device (DMD), the projection illuminance is being increased and the lens internal temperature during the projection is being raised. If the lens barrel of the projection optical system reaches a high temperature, at least a portion of the lens barrel causes a change such as deformation which might result in deterioration of the optical performance of the projection optical system. Particularly, since the stop member is the point where light rays are concentrated, it is easily affected by the change such as deformation due to the temperature rise.

To avoid this problem, as disclosed in Japanese Laid-Open Patent Application No. 2005-128217, there is a method of reducing the influence of the temperature rise to the stop member by providing the stop member with a reflection region having a high reflectance. More specifically, a reflection region having a reflectance of 30% or more or, alternatively, a heat-intercepting region or a heat-resistant region is provided in at least a portion of the image-display-element side face of the lens barrel which holds a lens or of the light-incidence side face of the stop member.

FIG. 16 is an exploded perspective view of a lens barrel disclosed in Japanese Laid-Open Patent Application No. 2005-128217. It has such structure that a reflection region 2 is provided on the light-incidence side face of a third-group barrel 1. The reflection region 2 may not be integral with the surface of the lens barrel which holds a lens, but it may be provided on the surface of an independent stop member which does not hold an optical lens.

The reflected light reflected by the reflection region of the prior art may be incident within an effective region, depending on the incidence angle of the light beam. Even when it is reflected to the outside of the effective region, if there is a member having a high reflectance placed in the direction of the reflection, the light beam might be incident again into the effective region. In that occasion, the unnecessary light beam incident into the effective region would cause flare and ghost, which has an adverse influence on deterioration of the optical performance of the projection optical system.

The present invention provides a projection optical system and/or an image projector apparatus by which at least one of the inconveniences mentioned above can be removed or reduced.

In accordance with an aspect of the present invention, there is provided a projection optical system for projecting an image of an image display element, comprising: a lens; and a holder configured to hold said lens and disposed at an image-display-element side of a stop, wherein at least a portion of an image-display-element side face of said holder or at least a portion of an image-display-element side face of a light-blocking member provided integrally with said holder at the image-display-element side of said holder, is inclined in a section including an optical axis of said lens so that a point nearer to the optical axis comes closer to the image display element.

In one preferred form of this aspect of the present invention, said at least a portion of an image-display-element side face of said holder or said at least a portion of an image-display-element side face of a light-blocking member provided integrally with said holder at the image-display-element side of said holder, includes a plurality of surfaces which are inclined in a section including an optical axis of said lens so that a point nearer to the optical axis comes closer to the image display element.

In a section including an optical axis of said lens, said at least a portion of an image-display-element side face of said holder or said at least a portion of an image-display-element side face of a light-blocking member provided integrally with said holder at the image-display-element side of said holder, may have a shape having a plurality of protrusions protruding toward the image-display-element side.

The at least a portion of an image-display-element side face of said holder or said at least a portion of an image-display-element side face of a light-blocking member provided integrally with said holder at the image-display-element side of said holder, may have a light intercepting shape.

The at least a portion of an image-display-element side face of said holder or said at least a portion of an image-display-element side face of a light-blocking member provided integrally with said holder at the image-display-element side of said holder, may be made of a metal material.

The projection optical system may further comprise a stop, wherein an image-display-element side face of said stop may be made of a metal material, and wherein said lens may be disposed at the image-display-element side of said stop.

The light blocking member may be disposed on a light path along which an imagewise light beam from the image display element is converged.

In accordance with another aspect of the present invention, there is provided an image projector, comprising: an image display element; and a projection optical system configured to project an image of said image display element, wherein said projection optical system includes a holder configured to hold a lens, and wherein at least a portion of an image-display-element side face of said holder or at least a portion of an image-display-element side face of a light-blocking member provided integrally with said holder at the image-display-element side of said holder, is inclined in a section including an optical axis of said lens so that a point nearer to the optical axis comes closer to the image display element.

In accordance with a further aspect of the present invention, there is provided a projection optical system for projecting an image of an image display element, comprising: a stop; a lens disposed at an image-display-element side of said stop; and a holder configured to hold said lens, wherein at least a portion of an image-display-element side face of said holder or at least a portion of an image-display-element side face of a light-blocking member provided integrally with said holder at the image-display-element side of said holder, is comprised of a reflection region having a reflectance higher than that of any other region of said holder, and wherein said reflection region is inclined with respect to a normal to an optical axis of said lens, into a direction by which a light ray outside an effective region is reflected toward a direction spaced apart from the optical axis.

In accordance with a yet further aspect of the present invention, there is provided an image projector, comprising: an image display element; and a projection optical system configured to project an image of said image display element; wherein said projection optical system includes a stop, a lens disposed at an image-display-element side of said stop, and a holder configured to hold said lens, wherein at least a portion of an image-display-element side face of said holder or at least a portion of an image-display-element side face of a light-blocking member provided integrally with said holder at the image-display-element side of said holder, is comprised of a reflection region having a reflectance higher than that of any other region of said holder, and wherein said reflection region is inclined with respect to a normal to an optical axis of said lens, into a direction by which a light ray outside an effective region is reflected toward a direction spaced apart from the optical axis.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

One preferred form of the present invention provides a high optical-performance projection optical system and an image projector apparatus, by which the aforementioned inconveniences can be avoided and unnecessary light beams are directed to the outside of effective region. The projection optical system in this preferred form of the present invention may comprise a projection optical system for projecting an image for an image display element such as a liquid crystal panel and a digital mirror device, for example, having features such as follows. That is, the projection optical system of the present invention has a holder for holding a lens. Furthermore, in the projection optical system of the present invention, at least a portion of the image-display-element side face of the holder or a portion of the image-display-element side face of a light-blocking member which is disposed integrally with the holder at the image-display-element side of the holder, is inclined in a section including the lens optical axis in the manner that a point closer to the optical axis comes closer to the image display element.

The present invention will now be explained in detail with reference to embodiments illustrated in FIG. 1 through FIG. 15.

Embodiment 1

Figure 1:
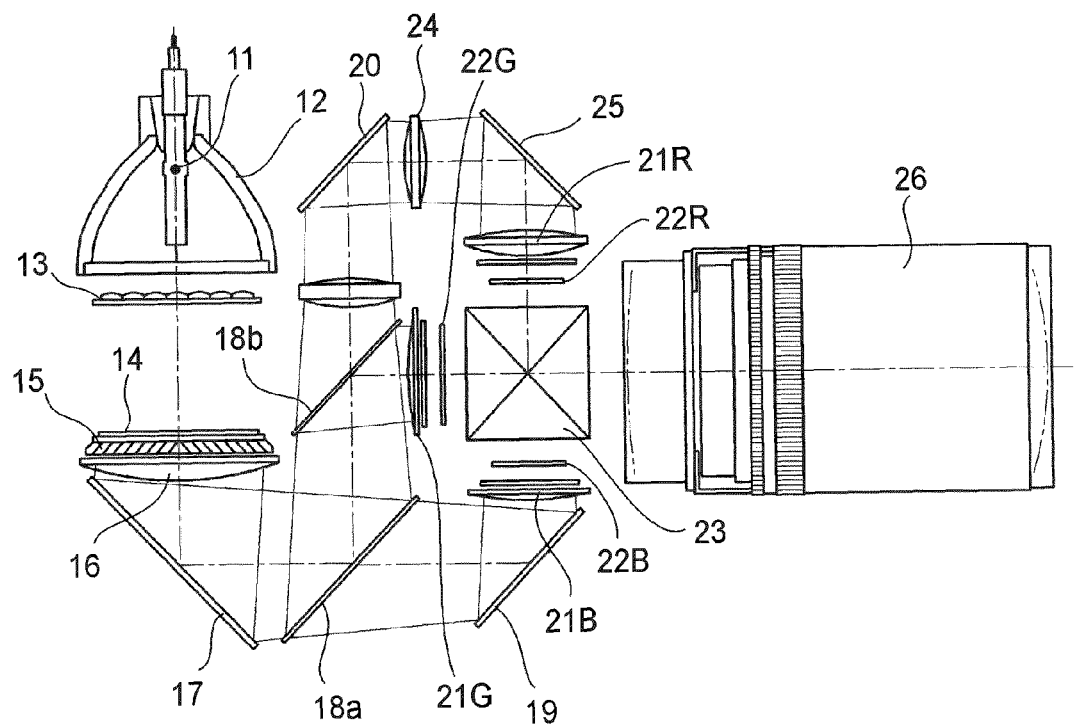
FIG. 1 is a schematic diagram of an image display device according to a first embodiment of the present invention.

FIG. 1 is a schematic diagram of a projector (image projector) having a projection optical system according to a first embodiment of the present invention. This projection optical system is a projection optical system configured to project an imagewise light beam based on a liquid crystal panel (image display element) to be described later.

A light source 11 is surrounded by a reflector 12, and, before this light source 11, there are a first fly eye lens 13, a second fly eye lens 14, a light polarization converting element 15, a condensing lens 16 and a mirror 17.

In the reflection direction of the mirror 17, there are a dichroic mirror 18a and a mirror 19. In the reflection direction of the dichroic mirror 18a, there are a dichroic mirror 18b and a mirror 20. Here, the light source 11 may comprise a lamp of 150 W or higher and, preferably, a lamp of 200 W or higher or, more preferably, 250 W or higher.

In the reflection direction of the mirror 19, there are a field lens 21B, a liquid crystal panel (liquid crystal panel for blue color) 22B, and a color synthesizing prism 23. On the other hand, in the reflection direction of the dichroic mirror 18b, there are a field lens 21G, a liquid crystal panel (liquid crystal panel for green color) 22G, and a color synthesizing prism 23. In the reflection direction of the mirror 20, a mirror 25 is placed through a relay lens 24. In the reflection direction of the mirror 25, there are a field lens 21R, a liquid crystal panel (liquid crystal panel for red color) 22R, and a color synthesizing prism 23. A projection optical system 26 is disposed in the light outgoing direction from the color synthesizing prism 23 upon which three colors of light beams (imagewise light) from three directions are incident.

The light from light source 11 is reflected by a reflector 12 such as a paraboloid to a direction toward the first fly eye lens 13, and approximately parallel light, that is, light which is apparently emitted from an infinite distance, is directed to the first fly eye lens 13. The thus directed light beam is split into a plurality of light beams by the function of the first fly eye lens 13, and the light beams divided thereby are directed to the second fly eye lens 14. Each light beam (partial light beam) from the second fly eye lens 14 is converted by the polarization converting element 15, from non-polarized light (natural light) into linearly polarized light (light having registered polarization direction). These lights are then directed to the condensing lens 16.

The polarized lights are color-separated by the dichroic mirrors 18a and 18b, and then they illuminate liquid crystal panels 22R, 22G and 22B which are image display elements, through the field lenses 21R, 21G and 21B. The imagewise lights from the liquid crystal panels 22R, 22G and 22B are synthesized by the color synthesizing prism 23, and the thus synthesized imagewise light is projected in an enlargement scale upon a screen, not shown, by a projection optical system 26. Here, the barrel of the projection optical system 26 has an inside structure effective to avoid light rays which do not directly contribute to the image formation.

Furthermore, although in the present embodiment the liquid crystal panel has been described as a transmission type, the liquid crystal panel may be of reflection type liquid crystal panel, and imagewise light formed by the reflection type liquid crystal panel may be enlarged and projected by using a projection optical system 26 similar to the one described above.

Figure 2:
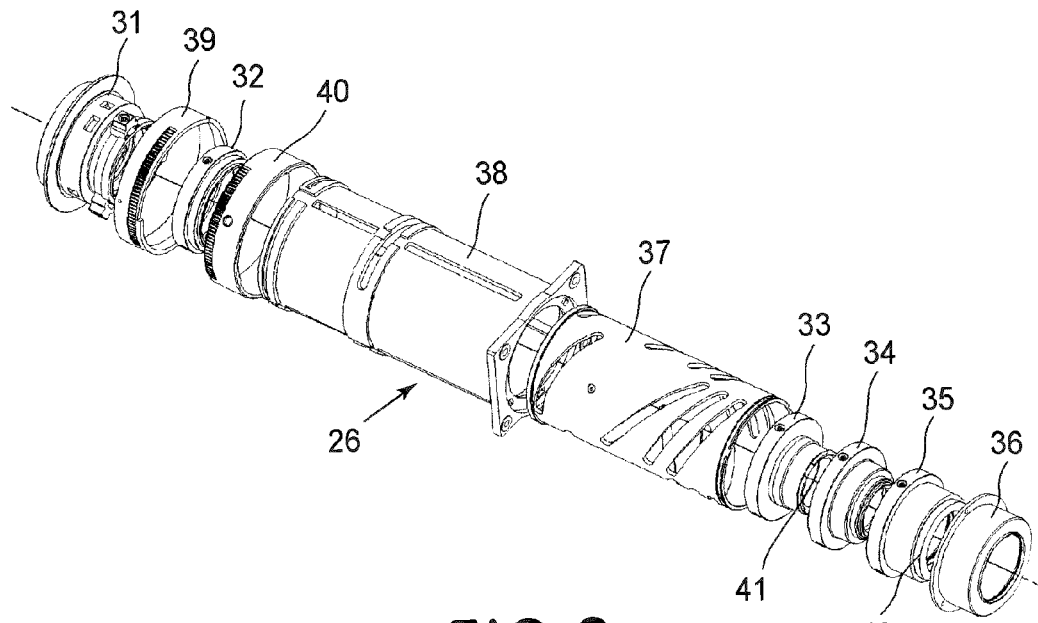
FIG. 2 is an exploded perspective view of a projection optical system.
Figure 3:
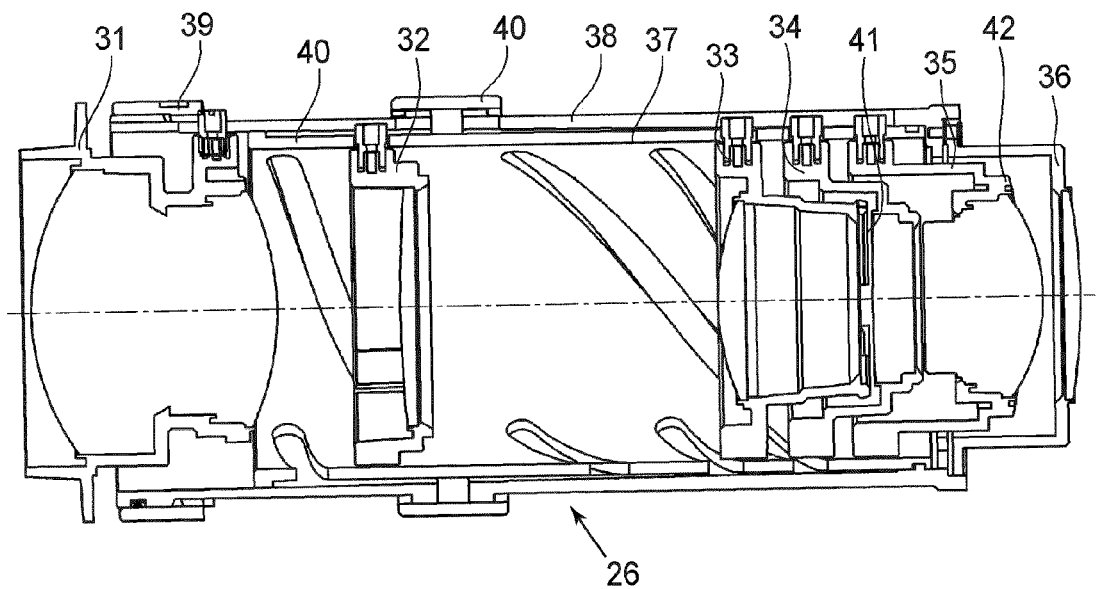
FIG. 3 is a section view of a projection optical system.

FIG. 2 is an exploded perspective view of the projection optical system, and FIG. 3 is a sectional view of the same. Along the optical axis, there are a first-group barrel 31, a second-group barrel 32, a third-group barrel 33, a fourth-group barrel 34, a fifth-group barrel 35 and a sixth-group barrel 36. The first-group barrel 31 to the fifth-group barrel 35 are accommodated inside a cam ring 37 which is a movable lens group. A fixed tube 38 is provided around the cam ring 37. A focus ring 39 and a zoom ring 40 are provided around the fixed tube 38. Furthermore, a stop member 41 is disposed between the third-group barrel 33 and the fourth-group barrel 34; namely, a stop is placed between the third-group and the fourth-group. Also, a light-blocking member 42 is provided between the fifth-group barrel 35 and the sixth-group barrel 36.

Here, although in the present embodiment the stop member 41 is provided separately from the lens or the lens holder, the invention is not limited to this. A holder or a holding frame for a certain lens may have a function as a stop or, as a further alternative, some mechanical member which does not hold a lens may be used as a stop. Furthermore, this projection optical system is connected to an outer covering box of the image projector through the sixth-group barrel 36. Although these barrel members may be made of any material, it is made of a resin material and a plastic material in the present embodiment.

The first-group barrel 31 holds a first lens group which is a focus system lens group. Based on the function of the cam of the focus ring 39 and the straight groove of the fixed tube 38, the first lens group is movable in the optical axis direction to adjust the focus. The second-group barrel 32, third-group barrel 33, fourth-group barrel 34 and fifth-group barrel 35 each holds a zoom lens group, and these function as a holder or holding means. The sixth-group barrel 36 holds a relay lens group, and it is fixed by a screw to the fixed tube 38 from the thrust direction.

If the zoom ring 40 is pivoted around the optical axis manually or electrically, based on the function of the cam groove of the cam ring 37 and the straight groove of the fixed tube 38, the second-group barrel 32 to the fifth-group barrel 35 move only by a predetermined amount in the optical axis direction, respectively, to perform the zooming.

Figure 4:
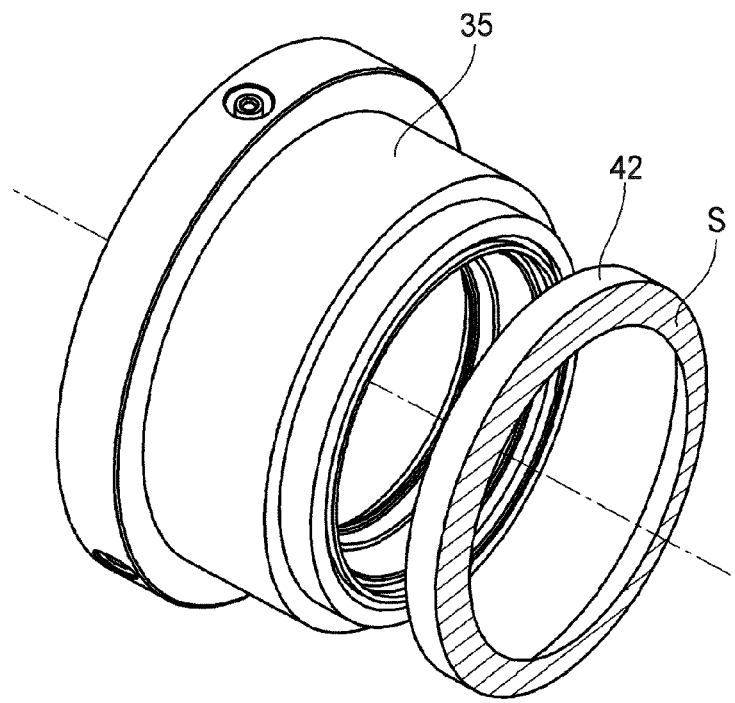
FIG. 4 is an exploded perspective view of a fifth-group barrel and a light-blocking member.
Figure 5:
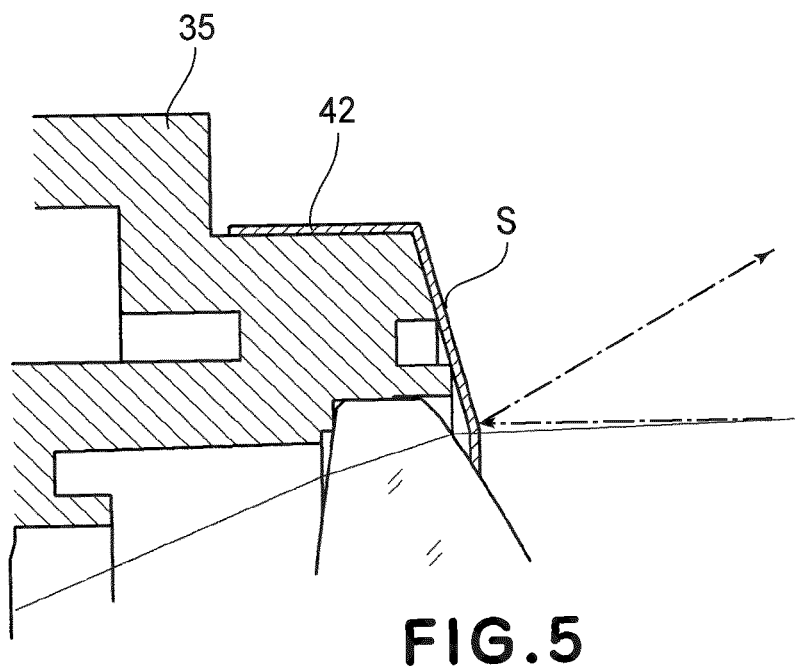
FIG. 5 is a section view of a fifth-group barrel and a light-blocking member.

FIG. 4 is an exploded perspective view of the fifth-group barrel, which is placed at the liquid-crystal-panel side (image-display-element side) of the stop member 41, and a light-blocking member (it may be a portion of the barrel) which is formed integrally with the fifth-group barrel. FIG. 5 is a sectional view of the same.

As shown in FIG. 4, a light-blocking member 42 which comprises a thin sheet-like member is fixed by adhesion to the light-entrance side surface (image-display-element side face) of the fifth-group barrel 35 which is a movable lens barrel near the sixth-group barrel 36. There is a reflection region S (which is at least a portion of the light-blocking member) at the light-entrance side of this light-blocking member 42, and the reflection region is inclined with respect to a plane perpendicular to the optical axis. More specifically, this reflection region is inclined in the sectional plane (the sheet of the drawing of FIG. 4) including the optical axis of the projection optical system, so that a point nearer to the optical axis comes closer to image display element. Namely, this reflection region is so inclined that the light incident from the image display element side is reflected toward the direction to be spaced apart or going away from the optical axis. Stating this in a different way, this reflection region is a portion of a convex surface about the optical axis, facing the image-display-element side.

Furthermore, although details will be described in an embodiment to be described later, this reflection region may include a plurality of surfaces being inclined in a section including the lens optical axis so that a point nearer to the optical axis comes closer to the image display element. Furthermore, it may have such a shape that, in the section including the lens optical axis, there are a plurality of protrusions protruding toward the image-display-element side. Furthermore, this reflection region may be formed with a light-intercepting shape, like an irregular internal surface shape effective to avoid specular reflection of unwanted light.

This reflection region may be comprised of a surface having high reflectance (reflectance of 30% or higher, more preferably, reflectance of 50% or higher). Specifically, it should desirably have a reflectance which is higher than that of any other barrel, particularly, that of a barrel (internal surface thereof) which is disposed at the irradiation-surface side (screen side) of the stop member. For example, it may be made of a metal such as aluminum.

The inner circumference of the reflection region S is close to the effective light-ray range (effective region of imagewise light), and it is formed with a shape effective to remove unnecessary light rays outside the effective region as much as possible. The reflection region S is so inclined to reflect unnecessary light rays, passing through outside the effective region, in the manner as depicted by a dash-and-dot arrow in FIG. 5; namely, the reflection region S functions to reflect the unnecessary light toward outside the effective region so that these are not incident again into the effective region.

Preferably, the reflection region may be inclined with respect to a normal to the optical axis by an angle not less than 3 deg. (5 deg.) and not greater than 60 deg. (30 deg.). Furthermore, the reflection region may be attached while following a slant surface formed on the light-entrance side face of the fifth-group barrel 35.

With the arrangement described above, the reflected light reflected by the reflection region S of the light-blocking member 42 is directed toward outside the effective region, and it does not enter again the effective region. Unnecessary light rays reaching the stop member 41 are reduced. As a result, any change in shape of the lens barrels from the fifth-group barrel 35 on which the light-blocking member 42 is attached to the stop member 41, due to a temperature rise, can be reduced or avoided. Thus, deterioration of the optical performance by the temperature rise can be reduced. Furthermore, unnecessary light rays which cause flare and ghost can be removed.

It is to be noted that the reflection region S may be provided integrally with the fifth-group barrel 35. The reflection region S can be made of a metal material or a material having high heat-resistance. Furthermore, the unnecessary light beam incident on the reflection region S may be a convergent light beam (the unnecessary light rays to be incident on the reflection region S may be convergent light rays advancing while approaching to the optical axis). This is also with the case of a second embodiment and embodiments following it, to be described below.

Embodiment 2

Figure 6:
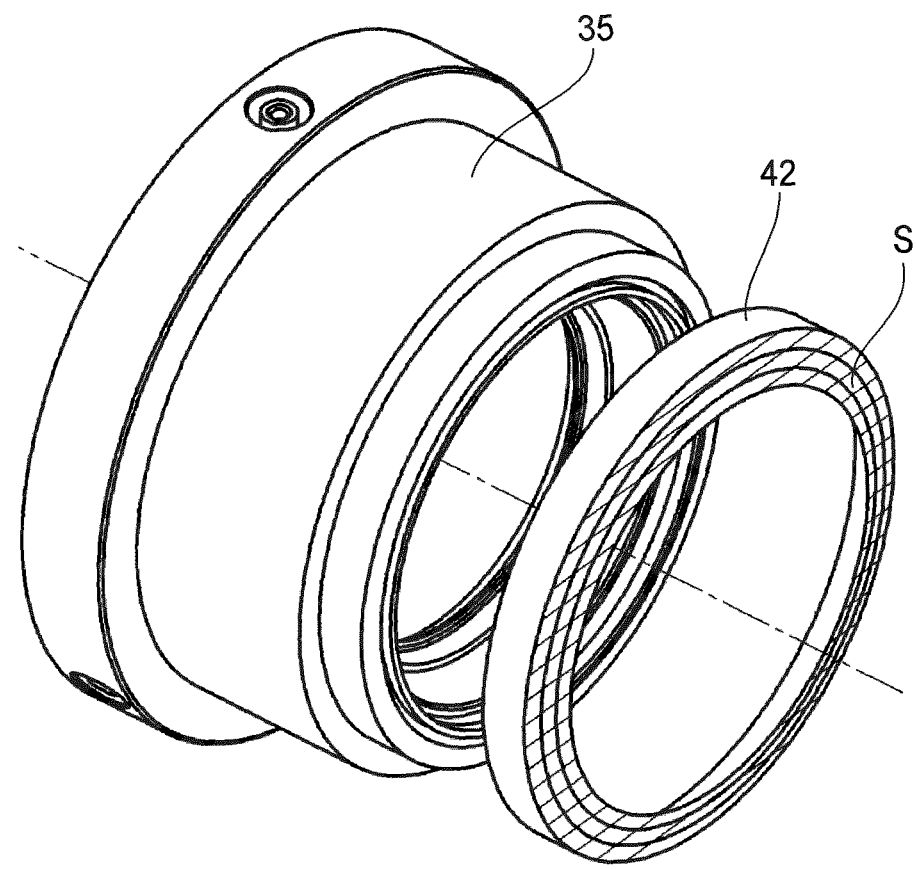
FIG. 6 is an exploded perspective view of a fifth-group barrel and a light-blocking member in a second embodiment of the present invention.
Figure 7:
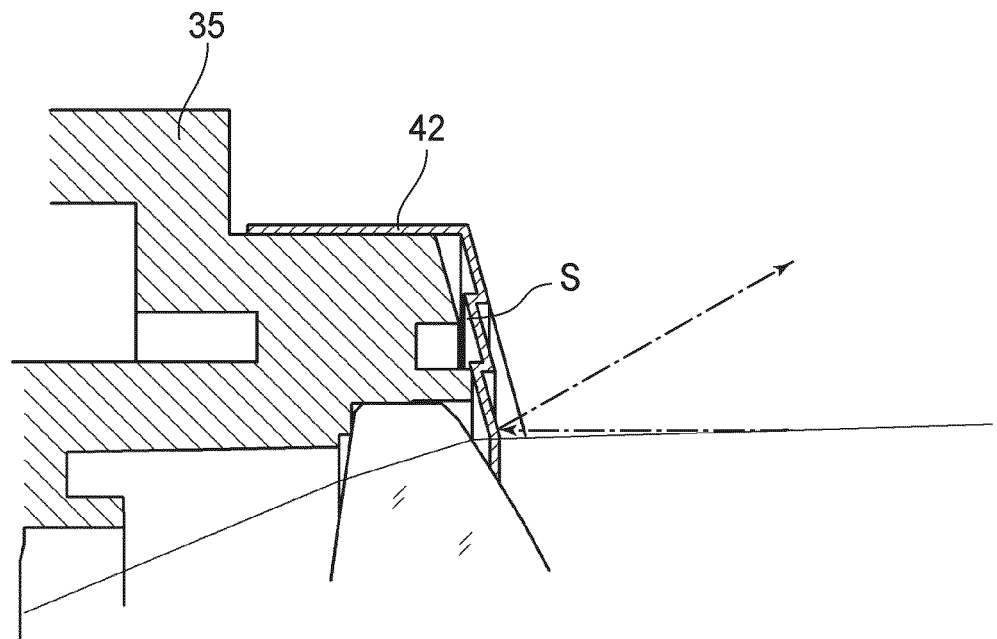
FIG. 7 is a section view of a fifth-group barrel and a light-blocking member.

FIG. 6 is an exploded perspective view of a fifth-group barrel and a light-blocking member according to a second embodiment of the present invention. FIG. 7 is a sectional view of the same.

The second embodiment concerns a projection optical system 26 like that of the first embodiment, but a light-blocking member 42 which is attached to the fifth-group barrel 35 has a light-intercepting shape comprised of inclined surfaces of multiple levels. The reflection region S has a shape effective to remove unnecessary light rays. With regard to the light-intercepting shape (light-intercepting groove shape), it may be a shape having a plurality of surfaces being so inclined, in a section including the optical axis, that a point nearer to the optical axis come closer to the image display element. Alternatively, it may be a shape having a plurality of protrusions being protruded toward the image display element in the section including the optical axis.

Embodiment 3

Figure 8:
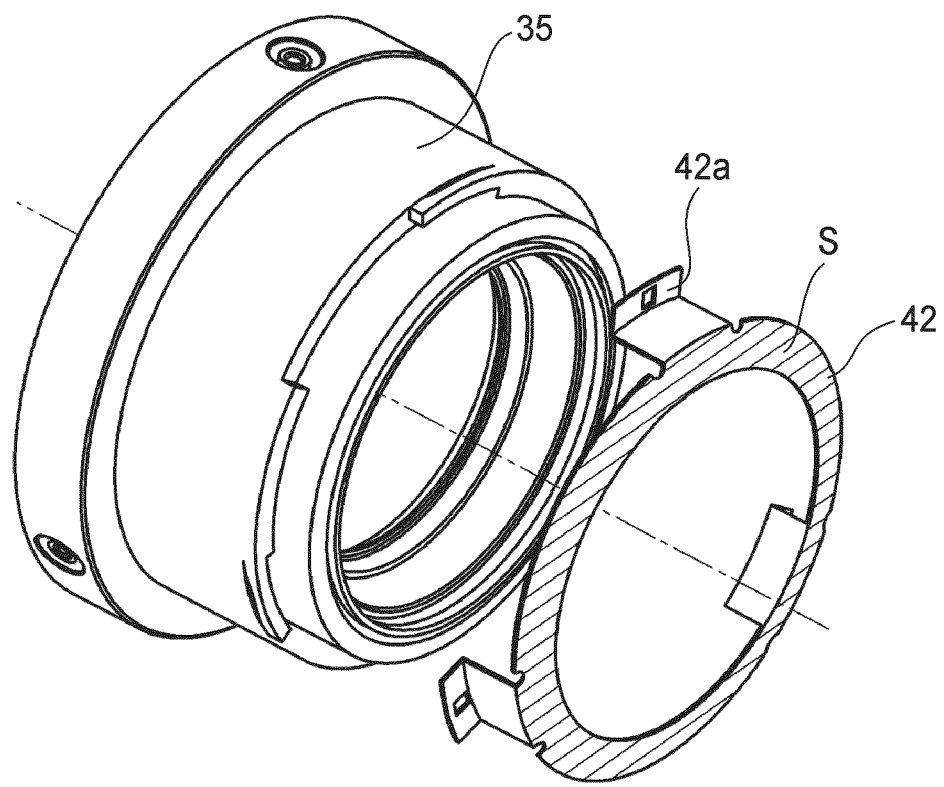
FIG. 8 is an exploded perspective view of a fifth-group barrel and a light-blocking member in a third embodiment of the present invention.
Figure 9:
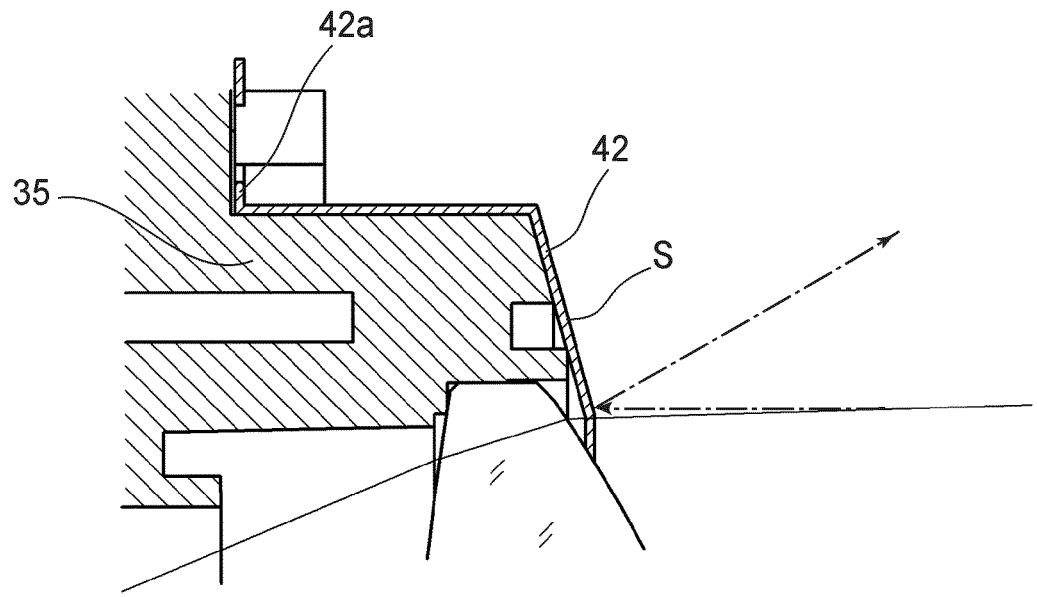
FIG. 9 is a section view of a fifth-group barrel and a light-blocking member.

FIG. 8 is an exploded perspective view of a fifth-group barrel and a light-blocking member according to a third embodiment of the present invention. FIG. 9 is a sectional view of the same.

The third embodiment concerns a projection optical system 26 like that of the first and second embodiments, but the shape and mounting method of the fifth-group barrel 35 and the light-blocking member 42 are different. The light-blocking member 42 has a snap fit 42a, and the light-blocking member 42 is fixed to the light-entrance side face of the fifth-group barrel 35 by means of the snap fit 42a. At the light-entrance side of the light-blocking member 42, there is a reflection region S having high reflectance.

Embodiment 4

Figure 10:
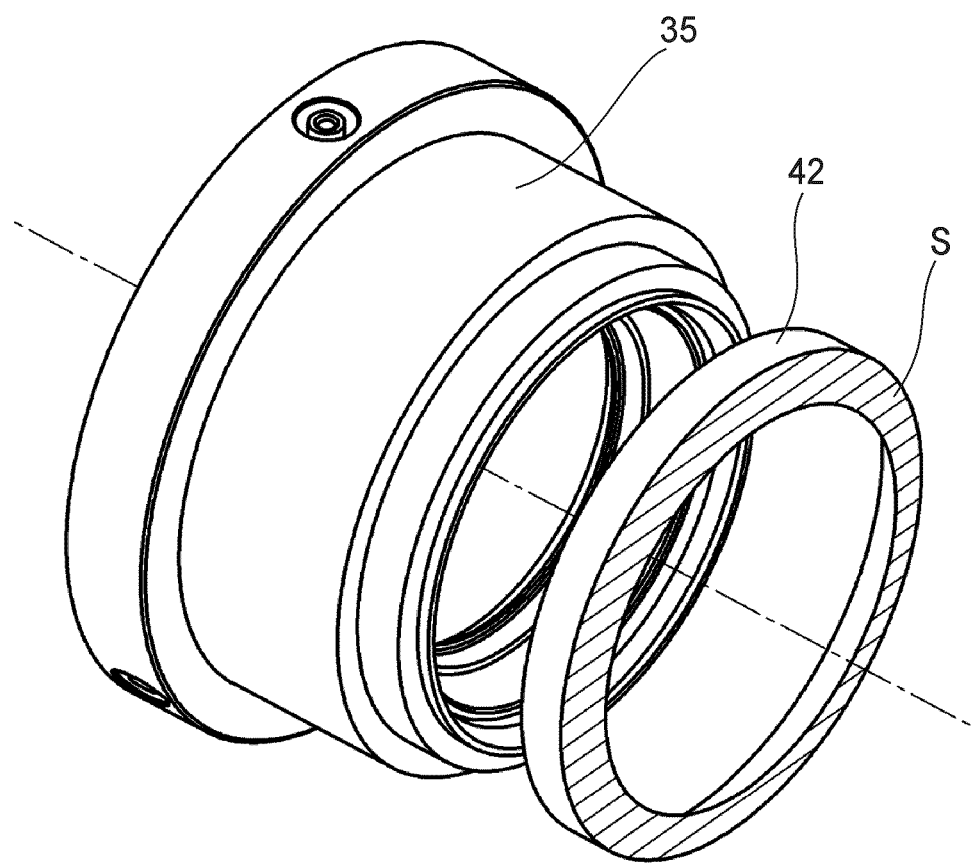
FIG. 10 is an exploded perspective view of a fifth-group barrel and a light-blocking member in a fourth embodiment of the present invention.
Figure 11:
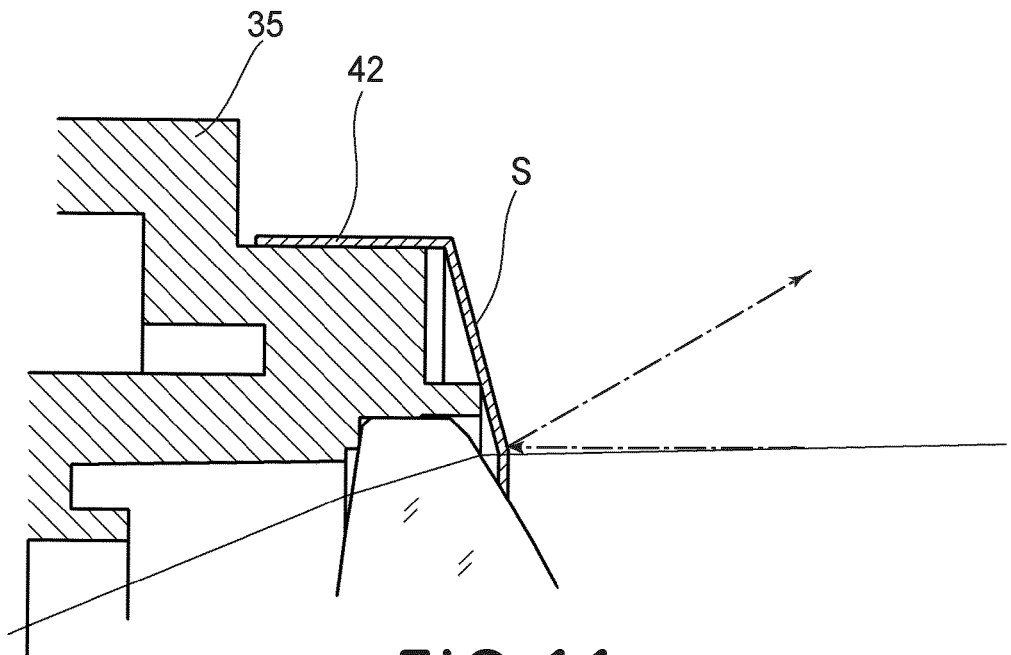
FIG. 11 is a section view of a fifth-group barrel and a light-blocking member.

FIG. 10 is an exploded perspective view of a fifth-group barrel and a light-blocking member according to a fourth embodiment of the present invention. FIG. 11 is a sectional view of the same.

The fourth embodiment concerns a projection optical system 26 like that of the first to third embodiments, but the light-entrance side face of the fifth-group barrel 35 is spaced apart from the inclined surface of the reflection region S of the light-blocking member 42. There is an air gap between the light-entrance side surface of the reflection region S of the light-blocking member 42 and the fifth-group barrel 35. The light-blocking member 42 is fixed to the light-entrance side surface of the fifth-group barrel 35, by adhesion or through a snap fit.

Embodiment 5

Figure 12:
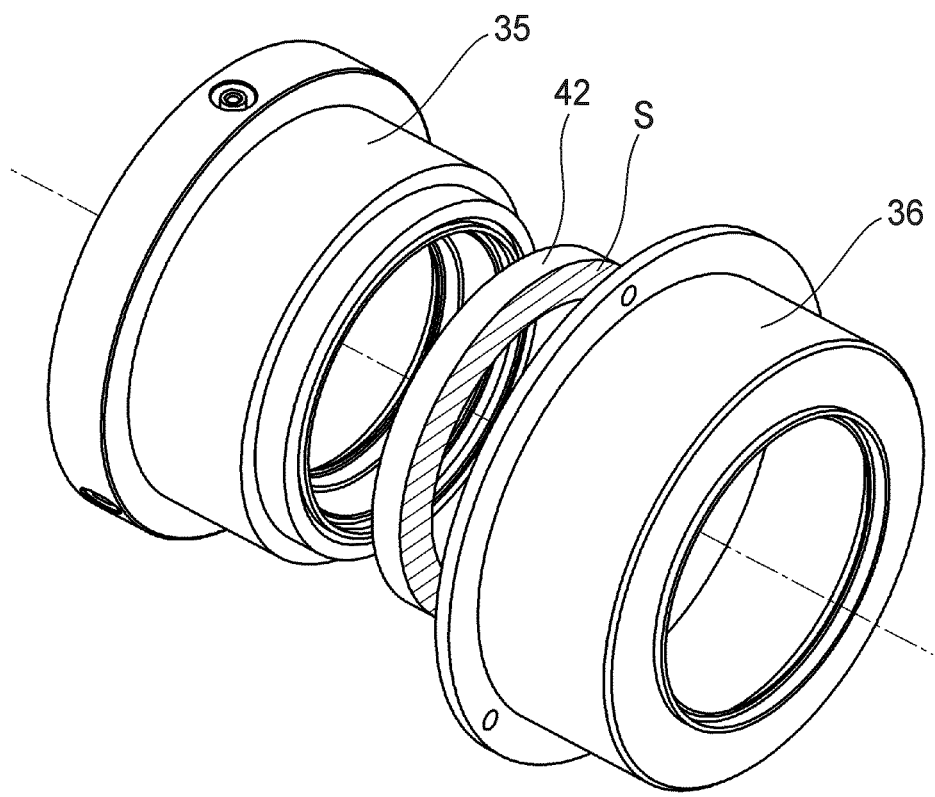
FIG. 12 is an exploded perspective view of a fifth-group barrel, a sixth-group barrel and a light-blocking member in a fifth embodiment of the present invention.
Figure 13:
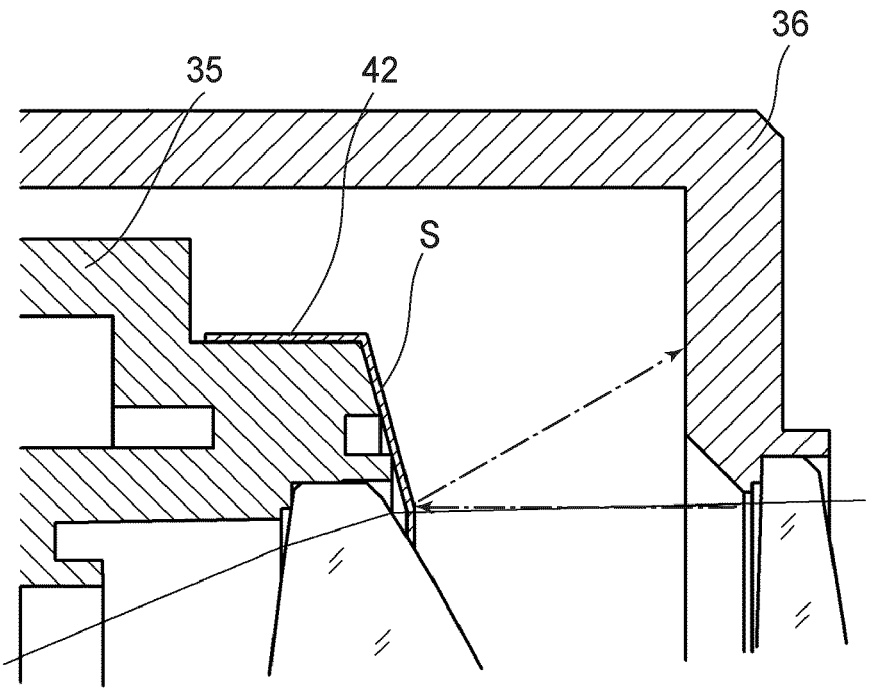
FIG. 13 is a section view of a fifth-group barrel, a sixth-group barrel and a light-blocking member.

FIG. 12 is an exploded perspective view of a fifth-group barrel, a light-blocking member and a sixth-group barrel in a projection optical system according to a fifth embodiment of the present invention. FIG. 13 is a sectional view of the same.

The fifth embodiment concerns a projection optical system 26 like that of the first to fourth embodiments, but the tilt of the reflection region S is so formed that reflected light reflected by the reflection region S of the light-blocking member 42 is directed toward outside the effective region of the sixth-group barrel 36.

The reflection region S is provided with a slant surface which is configured to reflect the removed unnecessary light rays toward outside the effective region and also to direct most of the reflected light rays toward the region outside the effective region of the sixth-group barrel 36 where re-entrance of them into the effective region can be avoided assuredly.

The reflected light reflected by the reflection region S of the light-blocking member 42 is directed to outside the effective region, and it does not enter again into the effective region. Thus, it causes temperature rise of the sixth-group barrel 36, in the region outside the effective region thereof. Then, based on optical deterioration due to the temperature rise of the sixth-group barrel 36, the balance of overall optical deterioration of the whole projection optical system 26 is controlled and it is reduced.

It is to be noted that the direction in which the reflected light from the reflection region S is directed does not need to be limited toward the sixth-group barrel 36. It may be directed toward any barrel holding any other lens.

Embodiment 6

Figure 14:
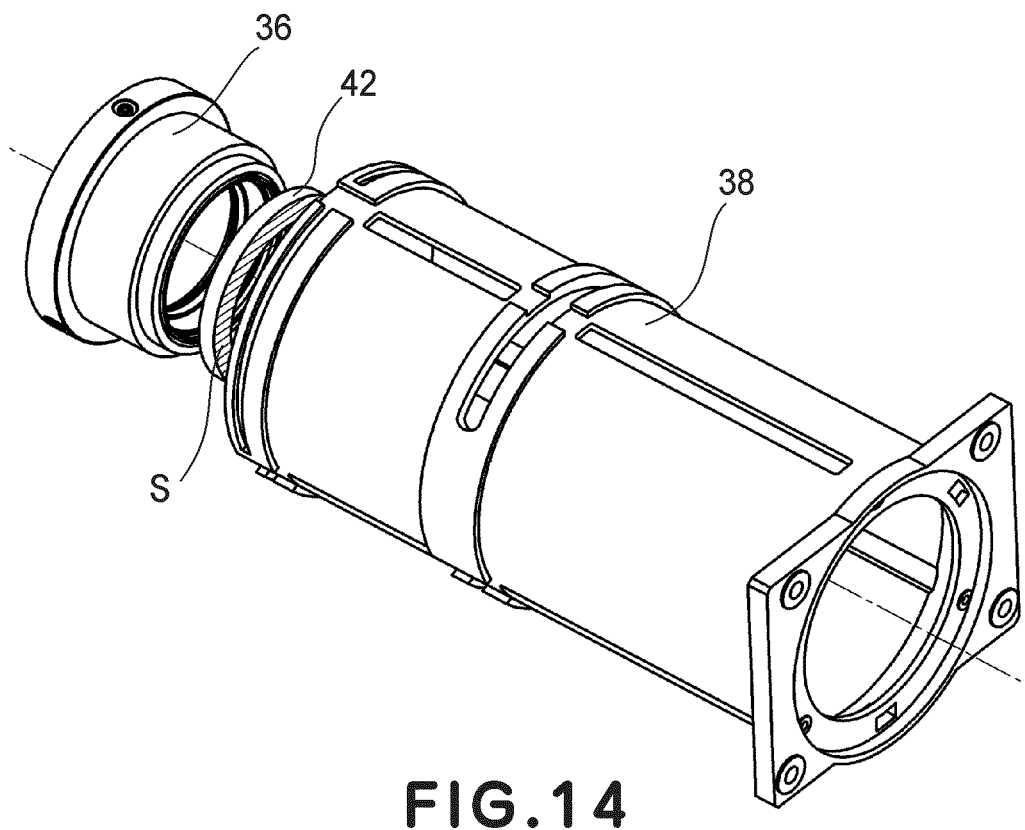
FIG. 14 is an exploded perspective view of a fifth-group barrel, a fixed tube and a light-blocking member in a sixth embodiment of the present invention.
Figure 15:
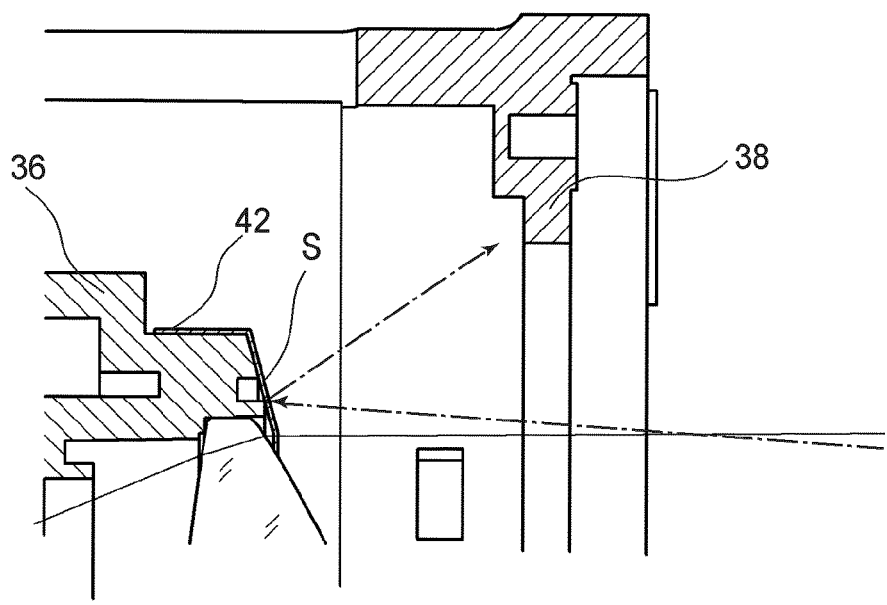
FIG. 15 is a section view of a fifth-group barrel, a fixed tube and a light-blocking member.
Figure 16:
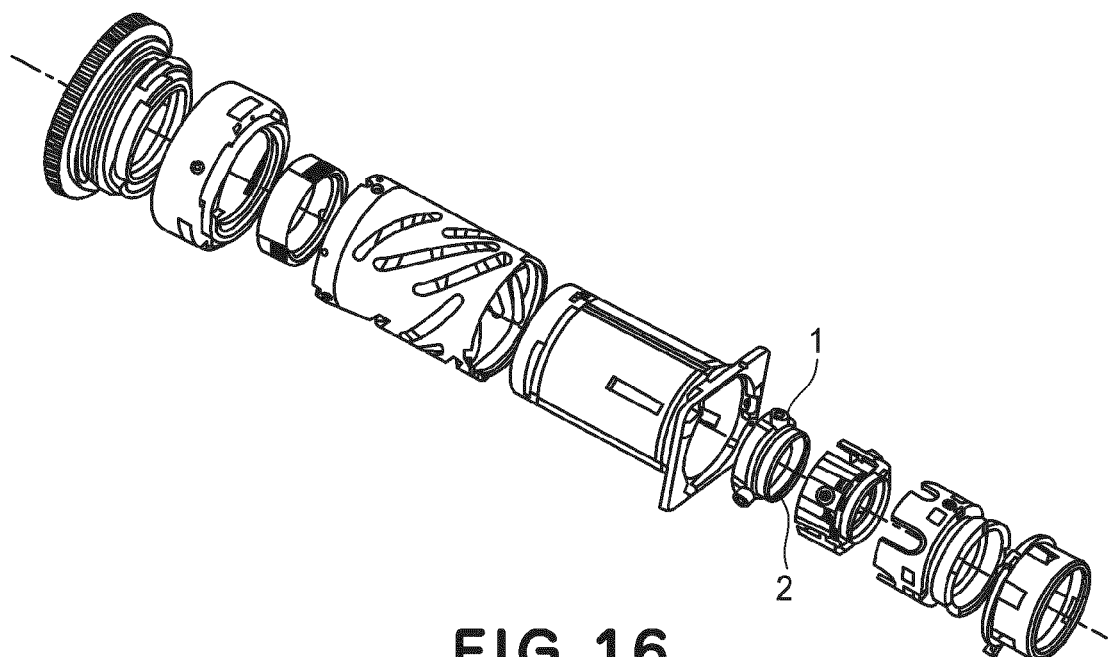
FIG. 16 is an exploded perspective view of a projection optical system having a conventional stop member.

FIG. 14 is an exploded perspective view which illustrates a fifth-group barrel, light-blocking member and a fixed tube according to a sixth embodiment of the present invention. FIG. 15 is a sectional view of the same.

The tilt of the reflection region S is so formed that the reflected light reflected by the reflection region S of the light-blocking member 42 which is attached to a sixth-group barrel 36 of the fifth embodiment is directed toward a fixed tube 38 which is a support member for the lens barrel.

The reflection region S is provided with a slant surface formed on the inner circumferential surface of the fixed tube 38, which is configured to reflect the removed unnecessary light rays toward outside the effective region and to prevent re-entrance of them into the effective region. It functions to direct most of the reflected light beam.

The reflected light reflected by the reflection region S of the light-blocking member 42 is directed toward outside the effective region, and it does not enter again into effective region. This causes temperature rise of the fixed tube 38. Then, based on optical deterioration due to the temperature rise of the fixed tube 38, the balance of overall optical deterioration of the whole projection optical system 26 is controlled, and it is reduced.

It is to be noted that the direction in which the reflected light from the reflection region S is directed does not need to be limited toward the fixed tube 38. It may be directed toward any barrel holding any other lens.

Although some preferred embodiments of the present invention have been described above, the invention is not limited to these embodiments. A variety of changes and modifications are possible within the scope of the invention.

Based on the structures as described above, unnecessary light can be directed to a component different from a lens holding member which easily affects the optical performance due to heat or thermal expansion (e.g., to an outer covering member of the projection optical system, an outer covering member of the image projector, or any other member that can be cooled easily). This accomplishes a projection optical system by which, when an image from an image display element is continuously projected for a long period of time, deterioration of the optical performance of the projection optical system can be made small (deterioration can be restrained).

Furthermore, in accordance with an optical device of the present invention (e.g., a projection optical system or a image projector apparatus), the incident light out of the effective region, being incident on the reflection region, is reflected toward the outer circumferential direction (outward) to be spaced away from (going away from) the optical axis. As a result, the possibility that the reflected light reflected by the reflection region enters again into the effective region becomes very low. Thus, the flare and ghost can be well suppressed and, additionally, any positional deviation of the lens due to expansion of the lens holding member or the like (expansion by the temperature rise) can be reduced.

In accordance with the projection optical system of the present invention as described above, the incident light outside the effective region, being incident on the reflection region (namely, unnecessary light), is reflected toward the outer circumferential direction to be spaced away from the optical axis. Thus, the flare and ghost can be reduced.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-258291 filed Oct. 2, 2007, for which is hereby incorporated by reference.

What is claimed is:

1. A projection optical system for projecting an image of an image display element, comprising:
   a lens movable to perform zooming;
   a stop;
   a holder configured to hold said lens and disposed at an image-display-element side of said stop; and
   a light blocking member disposed at the image-display-element side of said stop and fixed within said holder;
   wherein part of said light blocking member includes an extended part that extends to a position nearer to an optical axis of said lens beyond said holder, and at least a part of a face of the extended part of said light-blocking member nearer to the image-display-element side is inclined in a section including an optical axis of said lens so that a point nearer to the optical axis comes closer to the image display element, and
   wherein said holder is capable of effecting a zooming movement integrally with said lens and said light blocking member in the optical axis direction to perform the zooming.

2. A projection optical system according to claim 1, wherein said light-blocking member is provided integrally with said holder at the image-display-element side of said holder and includes a plurality of surfaces which are inclined in a section including an optical axis of said lens so that a point nearer to the optical axis comes closer to the image display element.

3. A projection optical system according to claim 1, wherein, in a section including an optical axis of said lens, said light-blocking member is provided integrally with said holder at the image-display-element side of said holder and has a shape having a plurality of protrusions protruding toward the image-display-element side.

4. A projection optical system according to claim 1, wherein said light-blocking member is provided integrally with said holder at the image-display-element side of said holder and has a light intercepting shape.

5. A projection optical system according to claim 1, wherein said light-blocking member is provided integrally with said holder at the image-display-element side of said holder and is made of a metal material.

6. A projection optical system according to claim 1, wherein an image-display-element side face of said stop is made of a metal material, and wherein said lens is disposed at the image-display-element side of said stop.

7. A projection optical system according to claim 1, wherein said light blocking member is disposed on a light path along which an imagewise light beam from the image display element is converged.

8. An image projector, comprising:
   an image display element; and
   a projection optical system configured to project an image of said image display element,
   wherein said projection optical system includes a lens movable to perform zooming;
   a stop;
   a holder configured to hold said lens and disposed at an image-display-element side of said stop; and
   a light blocking member disposed at the image-display-element side of said stop and fixed within said holder;
   wherein part of said light blocking member includes an extended part that extends to a position nearer to an optical axis of said lens beyond said holder, and at least a part of a face of the extended part of said light-blocking member nearer to the image-display-element side is inclined in a section including an optical axis of said lens so that a point nearer to the optical axis comes closer to the image display element, and
   wherein said holder is capable of effecting a zooming movement integrally with said lens and said blocking member in the optical axis direction to perform the zooming.

9. An image projector according to claim 8, wherein said light-blocking member is provided integrally with said holder at the image-display-element side of said holder and includes a plurality of surfaces which are inclined in a section including an optical axis of said lens so that a point nearer to the optical axis comes closer to the image display element.

10. An image projector according to claim 8, wherein, in a section including an optical axis of said lens, said light-blocking member is provided integrally with said holder at the image-display-element side of said holder and has a shape having a plurality of protrusions protruding toward the image-display-element side.

11. An image projector according to claim 8, wherein said light-blocking member is provided integrally with said holder at the image-display-element side of said holder and has a light intercepting shape.

12. An image projector according to claim 8, wherein said light-blocking member is provided integrally with said holder at the image-display-element side of said holder and is made of a metal material.

13. An image projector according to claim 8, wherein an image-display-element side face of said stop is made of a metal material, and wherein said lens is disposed at the image-display-element side of said stop.

14. An image projector according to claim 8, wherein said light blocking member is disposed on a light path along which an imagewise light beam from the image display element is converged.

15. A projection optical system according to claim 1, wherein said holder holds a lens located closest to the image display element side.

16. An image projector according to claim 8, wherein said holder holds a lens located closest to the image display element side.

* * * * *